United States Patent
Schuster et al.

(10) Patent No.: US 6,935,365 B2
(45) Date of Patent: Aug. 30, 2005

(54) ROTARY SLIDE

(75) Inventors: Bernd Schuster, Gottmadingen (DE); Bernd Schwarz, Singen (DE); Rufold Nikles, Oberentfelden (CH)

(73) Assignee: Georg Fischer Wavin AG, Subingen (CH)

( * ) Notice: Subject to any disclaimer, the term of this patent is extended or adjusted under 35 U.S.C. 154(b) by 327 days.

(21) Appl. No.: 10/352,296

(22) Filed: Jan. 27, 2003

(65) Prior Publication Data

US 2003/0140969 A1 Jul. 31, 2003

(30) Foreign Application Priority Data

Jan. 31, 2002 (DE) ......................................... 102 04 030

(51) Int. Cl.⁷ .............................................. F16K 37/00
(52) U.S. Cl. .................. 137/553; 251/129.11; 251/228; 251/366; 251/368
(58) Field of Search ......................... 137/553; 251/228, 251/129.11, 366, 368

(56) References Cited

U.S. PATENT DOCUMENTS

| | | | | |
|---|---|---|---|---|
| 2,443,036 A | * | 6/1948 | Hopkins | 251/228 |
| 3,237,916 A | * | 3/1966 | Bryant | 251/158 |
| 4,089,505 A | * | 5/1978 | Anderle et al. | 251/129.11 |
| 4,219,183 A | * | 8/1980 | Hoffmann et al. | 251/159 |
| 4,997,006 A | | 3/1991 | Zlobinsky et al. | |
| 6,089,537 A | * | 7/2000 | Olmsted | 251/129.11 |
| 6,435,473 B1 | * | 8/2002 | Dall'Osso et al. | 251/129.11 |

FOREIGN PATENT DOCUMENTS

| | | |
|---|---|---|
| DE | 1 755 664 | 11/1957 |
| DE | 35 38 404 | 4/1987 |
| DE | 36 10 975 | 10/1987 |
| DE | 43 13 633 | 10/1994 |
| DE | 197 16 915 | 11/1998 |
| DE | 198 58 860 | 6/2000 |

\* cited by examiner

Primary Examiner—A. Michael Chambers
(74) Attorney, Agent, or Firm—Bachman & LaPointe, P.C.

(57) ABSTRACT

A rotary slide for medium-carrying pipelines is proposed, comprising a housing (1) capable of being installed between two pipeline ends and having a stop member (9) for shutting off the pipeline and having an actuating device (8) for actuating the stop member, the housing possessing a first reception region (4) for receiving the stop member in the closed position of the rotary slide, a second reception region (5) for receiving the stop member in the open position of the rotary slide and a drive region (3) for receiving the actuating device, and the drive region (3) being arranged in the housing (1) separately from the first and the second reception region (4, 5). The rotary slide is distinguished by a compact and corrosion-resistant form of construction.

23 Claims, 5 Drawing Sheets

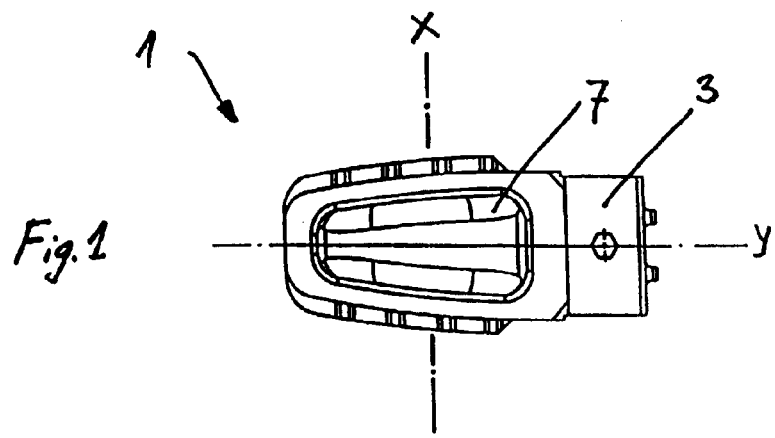
Fig. 1
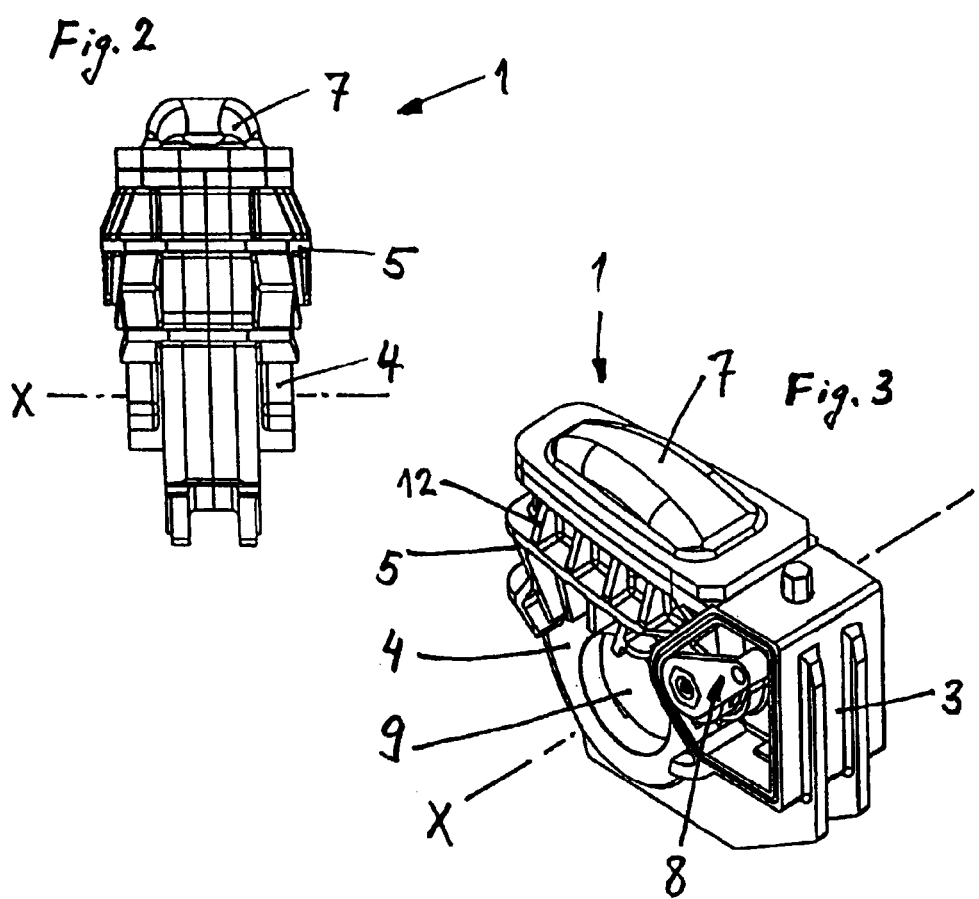
Fig. 2
Fig. 3

ROTARY SLIDE

BACKGROUND OF THE INVENTION

The invention relates to a rotary slide for medium-carrying pipelines, comprising a housing capable of being installed between two pipeline ends and having a stop member for shutting off the pipeline and having an actuating device for actuating the stop member, the housing possessing a first reception region for receiving the stop member in the closed position of the rotary slide, a second reception region for receiving the stop member in the open position of the rotary slide and a drive region for receiving the actuating device.

In pipeline construction, slides or flaps are used as shut-off members in main and distribution lines. The shut-off member is installed in the medium-carrying pipeline and consists essentially of a first region for connection to the pipeline, a second region for receiving the stop member in the open state of the shut-off member and a third region for receiving the actuating device which is conventionally designed as a spindle mechanism. The slides often have, on both sides of the slide housing, flanges, by means of which the shut-off member can be installed in the pipeline. The pipelines may be designed as a distribution network of a supply system. The medium in the pipeline may be gas, water or sewage. In other fields, too, for example chemical processing engineering, slides or flaps are used which have a disk-shaped shut-off member which is perpendicular to the pipeline axis and which is moved out of the pipeline in a plane running perpendicularly to the pipeline axis.

The type of movement of the shut-off disk may be a rectilinear or a rotational or pivoting movement in this plane. The axis of the rotational movement in this case runs perpendicularly to the pipeline axis and may lie inside or outside the shut-off disk. The most important advantage of this form of construction is the relatively small overall length, that is to say the space requirement in the axial direction of the pipeline is minimal. However, when the three abovementioned regions, that is to say the first reception region, the second reception region and the drive region, are arranged in a line one behind the other, the overall height becomes relatively large, that is to say, in the case of lines laid in the ground and having a shut-off member of large overall height, the line itself has to be buried at relatively great depth.

EP 1 063 457 A2 discloses a generic rotary slide. It describes what may be referred to as a pendulum slide for applications under a high vacuum in high-purity gas deposition plants. The rotary slide is used in a vacuum system, together with a turbovacuum pump, as a regulating member, so that the vacuum in the system can be set as accurately as possible. The housing and the slide are constructed from a plurality of individual parts made of metal and are designed for relatively low pressure resistance. After the pivoting movement from the open position, the slide is pressed, in the closing position, onto a seat in the housing. The lever arm connecting the shut-off disk to the actuating device cooperates with a ramp in the region of the pivot axis of the actuating device. What is achieved by this ramp is that, at the end of the pivoting movement, the disk is moved in the axial direction toward the seat.

It is an object of the invention to provide a rotary slide which can be constructed so as to be as compact and as corrosion-resistant as possible from individual parts which are as few as possible and can be produced as simply as possible. The rotary slide is also capable of being installed as simply as possible in existing pipeline systems.

SUMMARY OF THE INVENTION

The foregoing object is achieved by the present invention wherein a rotary slide for medium-carrying pipelines, comprises a housing capable of being installed between two pipeline ends and having a stop member for shutting off the pipeline and having an actuating device for actuating the stop member, the housing possessing a first reception region for receiving the stop member in the closed position of the rotary slide, a second reception region for receiving the stop member in the open position of the rotary slide and a drive region for receiving the actuating device, and the drive region being arranged in the housing separately from the first and the second reception region. The spatially separated arrangement of the drive region contributes greatly to increasing the corrosion resistance and useful life of the rotary slide.

It is advantageous that the rotary slide is constructed as compactly as possible. This is achieved in that both the reception regions and the drive region form three regions of the housing which are essentially of equal size, as seen in the direction of the pipeline axis. This is also achieved in that, as seen in the direction of the pipeline axis, the reception regions and the drive region are arranged adjacently to one another in the housing essentially in the manner of an equilateral triangle. The result of the compact form of construction of the rotary slide is that pipelines laid in the ground no longer have to be buried at an unnecessarily great depth.

It is also advantageous that the rotary slide can be produced in a simple way. This is achieved in that the drive region, the first reception region and at least the greatest part of the second reception region are designed as a one-piece housing. This is also achieved in that the housing is essentially designed virtually mirror-symmetrically with respect to a mirror surface running through the housing perpendicularly to the pipeline axis.

It is also advantageous, further, that as long a useful life as possible can be ensured for the rotary slide even when the latter is used in pipelines carrying corrosive medium. This is achieved in that the actuating device in the drive region is arranged so as to be sealed off relative to the medium in the first and the second reception region. This is also achieved, for example, in that the housing, together with the reception regions, and the drive region are produced in each case from a corrosion-resistant material. This is also achieved, for example, in that the housing, together with the reception regions, and the drive region are produced in each case from a mold in a plastic injection-molding method. This is also achieved in that all the regions of the shut-off member which may be touched by the medium are produced from a corrosion-resistant material. This is also achieved, further, in that all the regions of the shut-off member which may be touched by the medium are produced from a straightforward or reinforced plastic material.

It is also advantageous that the rotary slide can be installed in a simple way in an existing pipeline. This is achieved in that the housing has in the first reception region, on each of two opposite sides, a connection region for connection to the medium-carrying pipeline, at least the material of the connection region being compatible with the material of the pipeline. This is also achieved in that the connection region is designed as an electric welding sleeve.

BRIEF DESCRIPTION OF THE DRAWINGS

Exemplary embodiments of the invention are described with reference to the Figures, of which:

FIG. 1 shows a view of a rotary slide according to the invention with a closing cover, FIG. 2 shows a further view of the rotary slide of FIG. 1, FIG. 3 shows a perspective view of the rotary slide of FIGS. 1 and 2.

DETAILED DESCRIPTION

Figure 4:
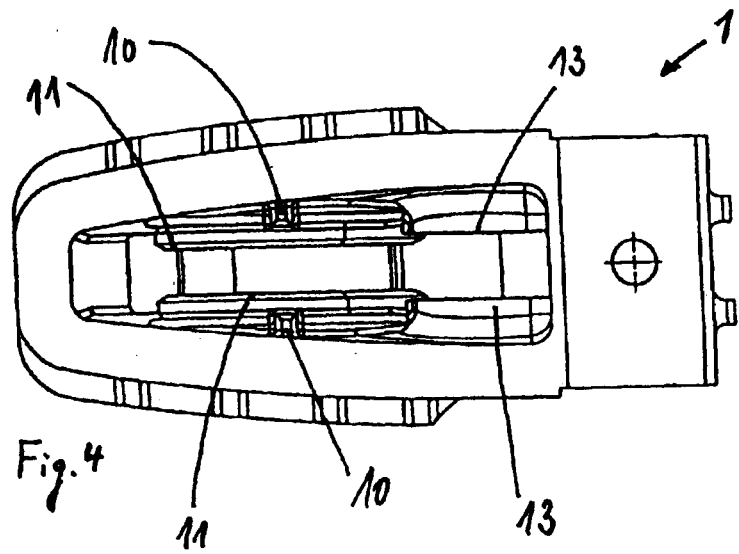
FIG. 4 shows a view of the rotary slide of FIG. 1 without the closing cover.

FIG. 1 illustrates a housing 1 of a rotary slide according to the invention in a top view of the housing 1, that is to say in a direction running perpendicularly to the pipeline axis X. The housing 1 is designed mirror-symmetrically or essentially mirror-symmetrically with respect to a mirror surface Y running perpendicularly to the pipeline axis X. Arranged on top of the housing 1 is a closing cover 7 which closes off the housing from above. A drive region 3 can be seen laterally next to the pipeline axis X.

FIG. 2 illustrates a side view of the housing 1 of FIG. 1. The drive region 3, a first reception region 4 and a second reception region 5 can be seen in FIGS. 1 and 2. The closing cover 7 can be seen contiguously to the second reception region 5. The drive region 3 serves for receiving an actuating device 8 which can be seen more clearly in FIGS. 6 to 9. The actuating device serves for actuating a stop member or valve means 9. The stop member 9 can be moved from the first reception region 4 into the second reception region 5 by means of the actuating device 8 in the drive region 3. When the shut-off member is in the closed position, the stop member 9 is received in the first reception region 4, and, when the shut-off member is in the open position, the stop member 9 is received in the second reception region 5 below the closing cover 7. Thus, the pipeline, which can be connected to the first reception region 4 of the housing 1, is released for the medium. The closing cover 7 can be connected to the housing 1 unreleasably by adhesive bonding or welding or releasably by screwing. The closing cover 7 can increase the stability of the housing 1. When the stop member 9 has to be exchanged and when the inner walls of the housing 1 have to be cleaned, the closing cover 7 may also be designed in such a way that it can be removed. The housing 1 may optionally also be constructed from two virtually mirror-symmetric halves.

It can be seen in FIG. 3 how the drive region 3, the first reception region 4 and the second reception region 5 all occupy, for example, a part of the housing 1 which is of approximately equal size. As seen in the direction of the pipeline axis X, the three regions 3, 4, 5 can occupy, for example, cross-sectional areas of approximately equal size. The reception regions 4, 5 and the drive region 3 are arranged relative to one another as being approximately at the corner points of an equilateral or at least isosceles triangle. The housing 1 thus has as small a surface extent as possible in a plane running perpendicularly to the pipeline axis X. As compact a design as possible of the shut-off member is achieved by means of this arrangement. The digging work necessary for installation of pipeline systems having the shut-off member according to the invention is restricted to a minimum. The overall height of the housing 1 is minimal, that is to say the pipelines can be laid substantially more closely below the surface of the ground.

Figure 5:
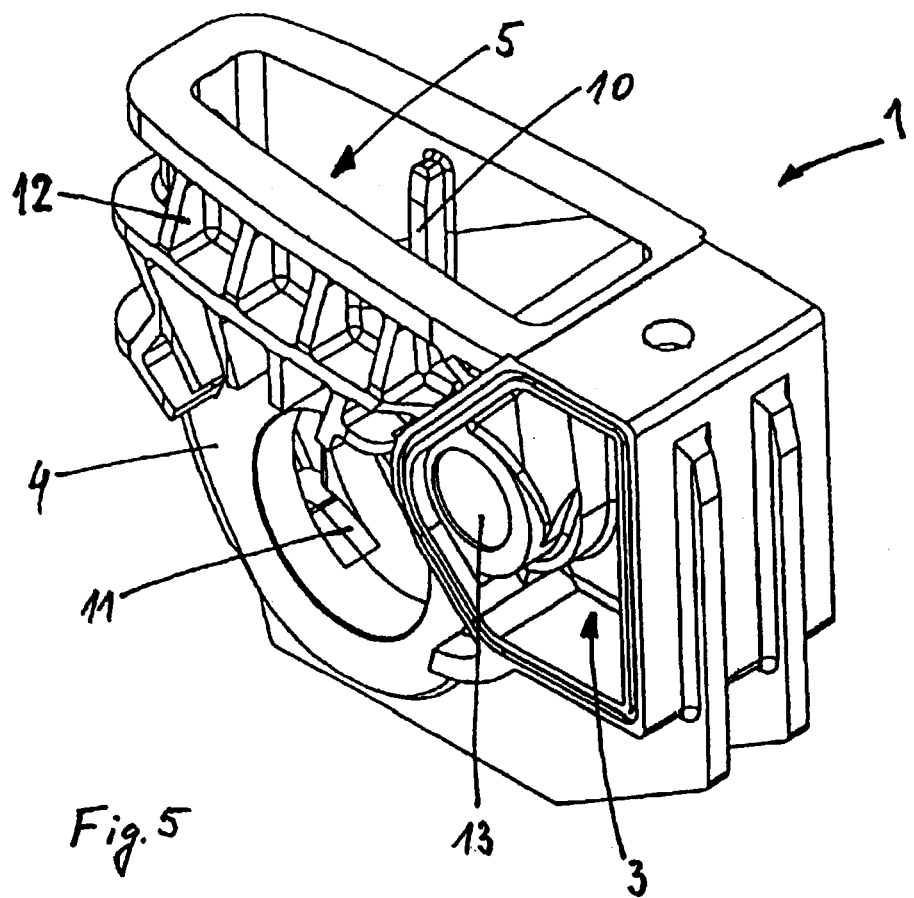
FIG. 5 shows a perspective view of the rotary slide of FIG. 4.

FIGS. 4 and 5 illustrate the housing 1 in a similar way to FIGS. 1 and 3, but without a closing cover 7. The stop member 9 has also been omitted in order to open up a view of the interior of the housing 1. Inside the housing 1, guide ribs 10 and sealing surfaces 11 can be seen, which serve for guiding and sealing off the stop member 9. The actuating device 8 has also been omitted. A bearing point 13 can be seen in the drive region 3. The bearing point 13 is arranged at the interface between the two reception regions 4, 5 and the drive region 3. The bearing point 13 may likewise be designed mirror-symmetrically on the front side and rear side of the housing 1. The housing 1 may be produced, for example, from a mold in an injection-molding method from a straightforward or reinforced plastic material or from another corrosion-resistant material. The plastic material used for pipelines laid underground may be, for example, polyethylene or polypropylene. The reinforcing means used may be glass fibers or carbon fibers or other nonpolymeric materials. All regions which may be touched by the medium in the pipeline are made from a suitable plastic material. This ensures high resistance against corrosion.

Figure 6:
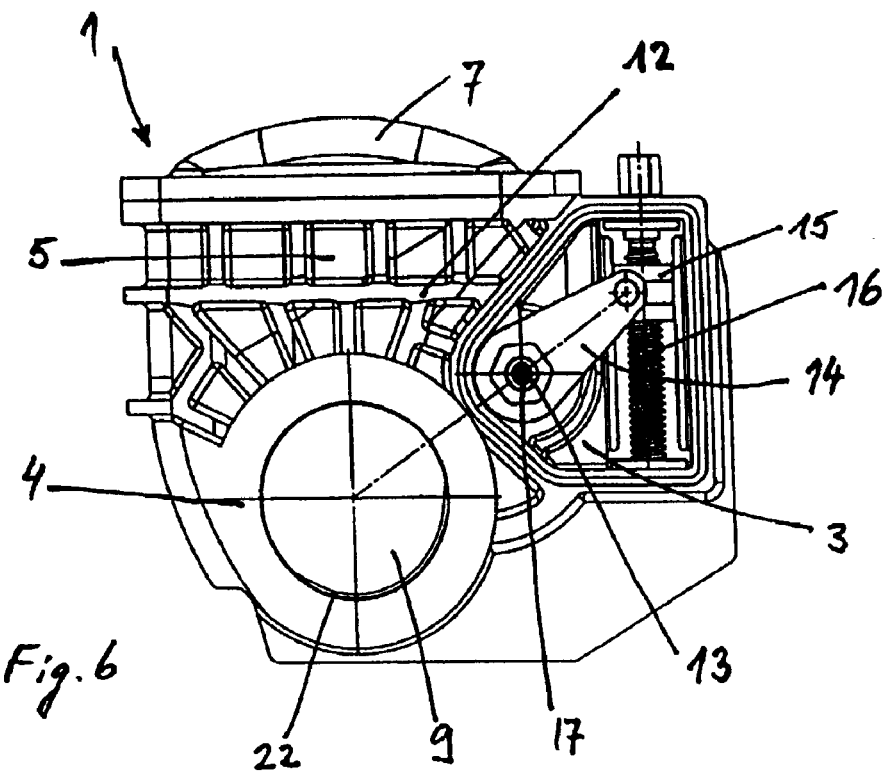
FIG. 6 shows a view of the rotary slide of FIGS. 1 to 3 with a stop member and with an actuating device.
Figure 7:
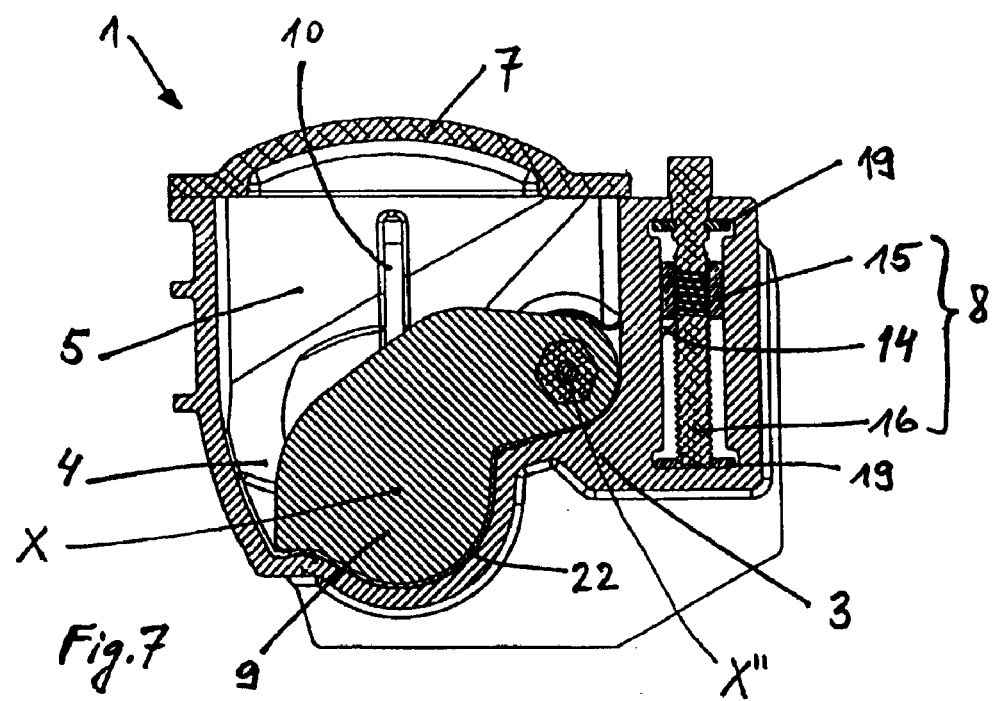
FIG. 7 shows a section through the rotary slide of FIG. 6.

FIGS. 6 and 7 illustrate the housing 1, as seen in the direction of the pipeline axis X. FIG. 7 illustrates the housing 1 in section in a plane perpendicular to the pipeline axis X. This plane may also be the plane Y of symmetry for the housing 1. The compact arrangement of the two reception regions 4, 5 and the drive region 3 are also shown clearly in FIGS. 6 and 7. In FIGS. 3, 5 and 6, ribs 12 can also be seen on the outside of the housing 1. The ribs 12 may be designed as longitudinal and/or transverse ribs. The ribs 12 serve, inter alia, as reinforcing ribs for the walls of the housing 1. By virtue of the arrangement of the reinforcing ribs 12, the walls of the housing 1 can be produced so as to be substantially thinner, thus contributing considerably to a saving in terms of material and weight of the housing 1. The bearing point 13 is located where the three regions 3, 4, 5 meet. The stop member 9 is essentially a disk made from plastic material. The disk 9 is firmly connected in the region of the bearing point 13 to a lever arm 14 which, in turn, is connected moveably to a nut 15 which is moved up and down by a spindle 16. The spindle 16, the nut 15 and the lever arm 14 are preferably all produced from metal. However, the spindle, the nut and the lever arm may also be produced from a plastic or, for example, also from a fiber-reinforced plastic material, when the forces which arise allow this.

The lever arm 14 may be both of one-sided and of double-sided design. In the double-sided version, two identical lever arms 14 are located on both sides of the housing 1. The drive region 3 is not touched by the medium. The spindle 16 may be connected to a drive motor, not illustrated, for driving the spindle. By the spindle 16 being combined with the lever 14 and the nut 15, a step-up between the movement of the disk 9 and that of the spindle 16 is achieved. The result of this combination is that the spindle 16 has a shorter length than in commercially available rotary slides. This contributes to a smaller housing 1 and to as compact a form of construction of the rotary slide as possible. By virtue of the step-up, the spindle 16 is also subjected to less load and can therefore be designed in a correspondingly simpler and easier way.

A shaft 17, which is produced, for example, from metal, is also located in the region of the bearing point 13. The shaft 17, which also serves as a rotary bearing, rotates about an axis X'' which is arranged parallel to the pipeline axis X. The sealing off of the drive region 3 is achieved by means of seals 20 which are arranged on the shaft 17, between the shaft 17 and the front and the rear side of the housing 1, in the region of the bearing point 13. The spindle 16 is mounted in the drive region 3 and is held by two plates 19 which also serve as an upper and a lower abutment for the nut 15.

FIGS. 8 and 9 again illustrate the shut-off member in a similar way to FIGS. 6 and 7. It can be seen in FIG. 8 how the disk 9 can be pivoted away from the first reception region 4 into the second reception region 5 when the combination of nut 15 and spindle 16 is actuated. The disk 9 and the lever arm 14 are depicted in two different positions. An upper position, in which the disk 9 has been pivoted away completely out of the first reception region 4 into the second reception region 5 and in which the pipeline is released completely for the passage of the medium, and a second position, in which the disk 9 is still located partially in the first reception region 4. A seal 20 for sealing off the shaft 17 and the drive region 3 relative to the medium can also be seen in FIG. 8.

Figure 8:
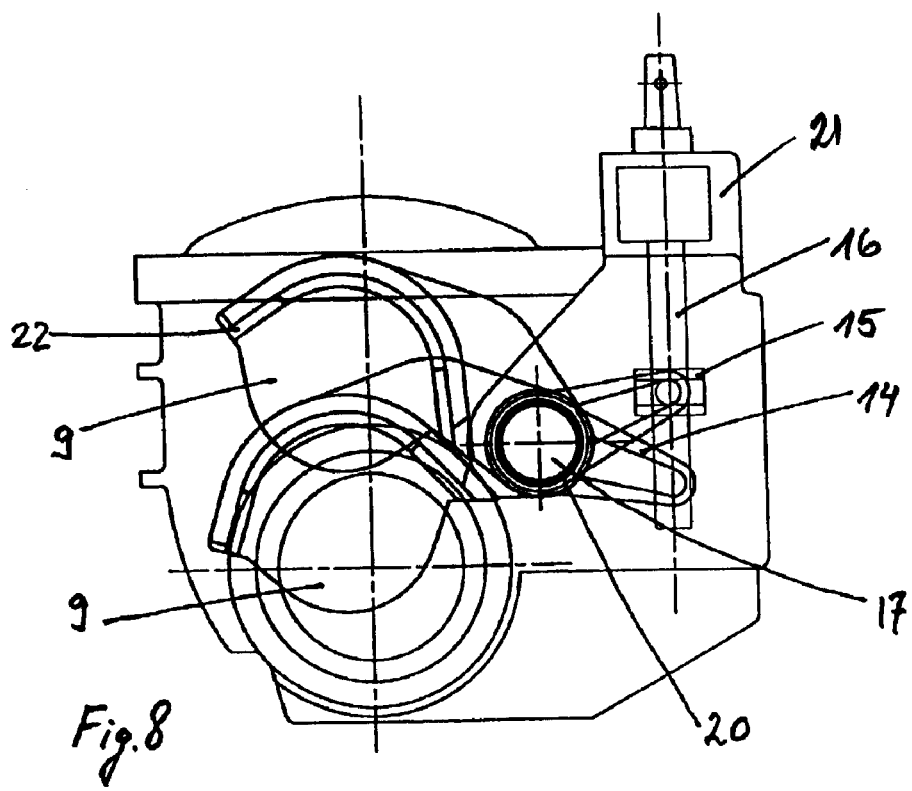
FIG. 8 shows a view of the rotary slide of FIG. 6 with a torque limitation device.
Figure 9:
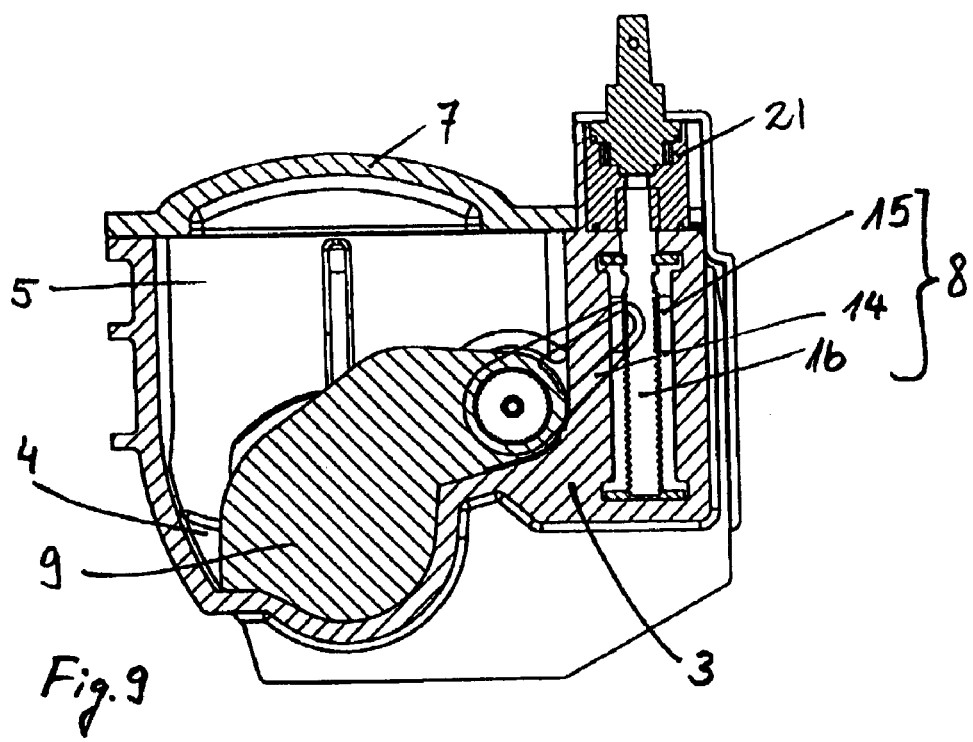
FIG. 9 shows a section through the rotary slide of FIG. 8.

In FIGS. 8 and 9, a device 21 for limiting the torque of the actuating device 8 is arranged on top of the spindle 16. The torque limitation device 21 is designed, here, as a slipping clutch, but may also be designed, for example, as a shearing pin. The slipping clutch 21 prevents the spindle 16 from being actuated with excessive torque. Above all, in the two end positions of the disk 9, that is to say both in the completely open position and in the completely closed position of the shut-off member, this prevents an excessively high force from being exerted on the disk 9. What is achieved thereby is that the shut-off member is insensitive to faulty manipulations during opening and closing. The slipping clutch 21 may be designed in such a way that an audible noise or another signal is emitted when the torque is exceeded.

It can also be seen in FIGS. 6, 7 and 8 how a seal 22 is arranged between the disk 9 and the housing 1. The seal 22 is a part, for example made from elastomeric material, which comes to bear in the lower region of the disk 9 on the circumference of said lower region and, in the upper region of the disk 9, is arranged on both sides in the edge region of the disk 9. In the production method, the seal 22 is preferably inserted into the injection mold of the disk 9 and is subsequently injection-coated with the plastic material of the disk 9. As an alternative, the seal 22 and the disk 9 may also be connected to one another in what is known as a two-component injection-molding method. In this method, first a first component of the connection, for example the seal 22, is injected from a first plastic material into the mold and subsequently has injected over it the plastic material of the second component, for example the disk 9. The seal 22 may also be fastened to the disk 9 at final assembly by a robot or by hand. The plastic disk 9 thus forms a unit with the elastomeric seal 22.

Figure 10:
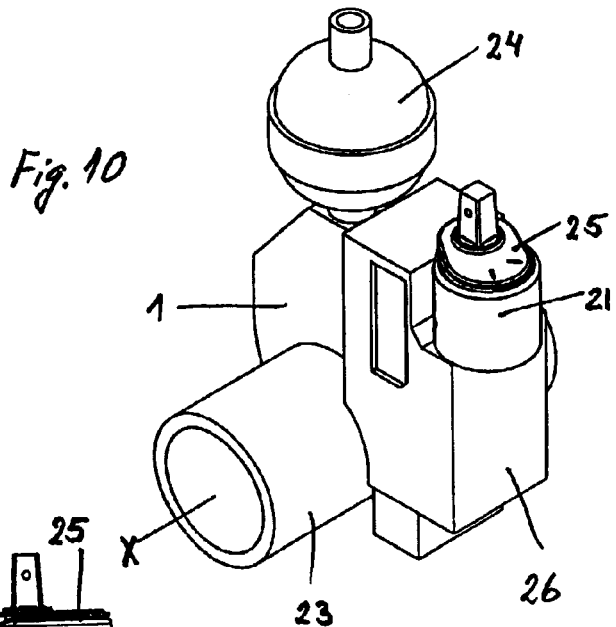
FIG. 10 shows a perspective view of a ready-to-install rotary slide.
Figure 11:
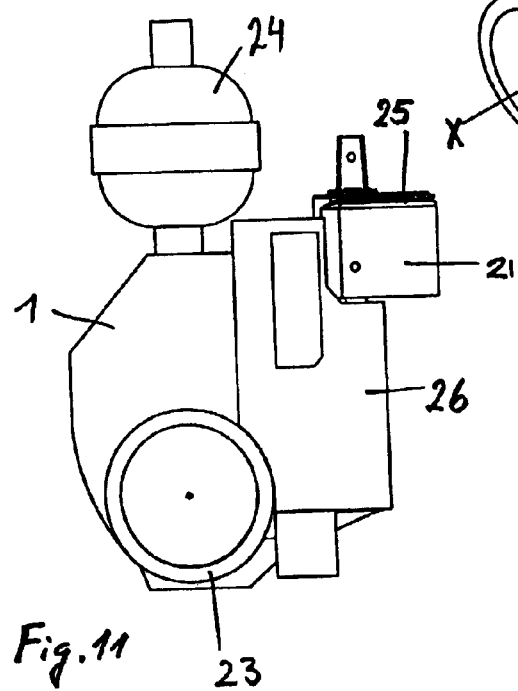
FIG. 11 shows a view of the rotary slide of FIG. 10.
Figure 12:
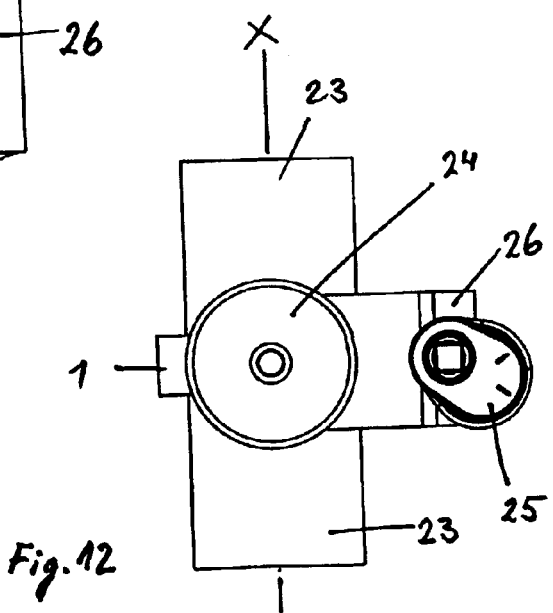
FIG. 12 shows a further view of the rotary slide of FIG. 10.

FIGS. 10, 11 and 12 once again illustrate the shut-off member diagrammatically. FIG. 10 shows the shut-off member in a perspective view similar to that in FIGS. 3 and 5. In FIGS. 10, 11 and 12 can be seen, inter alia, a connection region 23 for connecting the housing 1 to the pipeline, a venting device 24 for venting the housing 1, a position indicator 25 for indicating the position of the disk 9 and a closing piece 26 for closing off the drive region 3 and the housing 1. The position indicator 25 for indicating the position of the shut-off member is connected to the spindle 16. The position indicator 25 may be designed as a mechanical, electrical or electromagnetic indicator. Depending on the indicator design, the indicator 25 of the slide position may also be read off at a greater distance from the rotary slide.

The connection regions 23 are produced from a plastic material which is compatible with the material of the pipeline to be connected and which can be welded to the pipeline. The connection regions 23 may be designed, for example, as electric welding sleeves. The rotary slide can be used for pipelines with a line diameter within a relatively large range, for example from DN (=standard diameter) 15 to DN 300 mm. It can be used for distribution networks and domestic connections of gas, water and sewage systems. The shut-off member is distinguished by a modular construction with various options, such as, for example, the position indicator 25 and the venting 24, is constructed as simply and as compactly as possible and, in the regions touched by the medium, has no parts which are at risk of corrosion.

What is claimed is:

1. A rotary slide for a medium-carrying pipeline having an axis x, comprising a housing (1) capable of being installed between two pipeline ends, valve means (9) located in the housing for shutting off the pipeline, an actuating device (8) for actuating the valve means wherein the actuating device (8) has a spindle (16) which has an axis substantially perpendicular to a pipeline axis X, the spindle is operatively connected to the valve means (9) by means of a nut (15) and a lever arm (14), the housing defines a first reception region (4) for receiving the valve means when in the closed position of the rotary slide, a second reception region (5) for receiving the valve means when in the open position of the rotary slide and a drive region (3) for receiving the actuating device (8), wherein the drive region (3) is separate from the first and the second reception region (4, 5).

2. The rotary slide as claimed in claim 1, wherein the actuating device (8) is arranged in the drive region (3) and sealed off relative to the medium in the first and the second reception region (4, 5).

3. The rotary slide as claimed in claim 1, wherein the drive region (3), the first reception region (4) and at least the greatest part of the second reception region (5) are designed as a one-piece housing (1).

4. The rotary slide as claimed in claim 1, wherein both the first and second reception regions (4, 5) and the drive region (3) form three regions of the housing (1) which are essentially of equal size, as seen in a direction of a pipeline axis X.

5. The rotary slide as claimed in claim 4, wherein, as seen in the direction of the pipeline axis X, the reception regions (4, 5) and the drive region (3) are arranged adjacently to one another in the housing (1) essentially in the form of an equilateral triangle.

6. The rotary slide as claimed in claim 1, wherein the housing (1) is essentially designed virtually mirror-symmetrically with respect to a mirror surface Y running through the housing perpendicularly to the pipeline axis X.

7. The rotary slide as claimed in claim 1, wherein the housing (1), together with the reception regions (4, 5), and the drive region (3) are formed of a corrosion-resistant material.

8. The rotary slide as claimed in claim 1, wherein the housing (1), the reception regions (4, 5), and the drive region (3) are formed of plastic.

9. The rotary slide as claimed in claim 1, wherein all regions of the shut-off member touched by the medium are formed of a corrosion-resistant material.

10. The rotary slide as claimed in claim 1, wherein all regions of the shut-off member touched by the medium are formed of a plastic material.

11. The rotary slide as claimed in claim 1, wherein a torque limitation device (21) for limiting the torque of the actuating device (8) is associated with the actuating device.

12. The rotary slide as claimed in of claim 11, wherein the torque limitation device is a slip clutch (21).

13. The rotary slide as claimed in claim 1, wherein the actuating device (8) is produced from metal.

14. The rotary slide as claimed in claim 1, wherein the valve means (9) and the lever arm (14) are firmly connected to one another by means of a common rotary bearing (17), the rotary bearing is arranged in the housing (1) at an interface between the first reception region (4), the second reception region (5) and the drive region (3).

15. The rotary slide as claimed in claim 14, wherein seals (20) for sealing against contact by the medium are arranged between the rotary bearing (17) and the medium.

16. The rotary slide as claimed in claim 1, wherein a position indicator (25) for indicating the valve means is associated with the spindle (16).

17. The rotary slide as claimed in claim 16, wherein the position indicator (25) is designed as one of a mechanical, electrical, and electromagnetic indicator.

18. The rotary slide as claimed in claim 1, wherein the housing (1) has in the first reception region (4), on each of two opposite sides, a connection region (23) for connection to the medium-carrying pipeline, the connection region being formed of a material which is compatible with a material of the pipeline.

19. The rotary slide as claimed in claim 18, wherein the connection region (23) is an electric welding sleeve.

20. The rotary slide as claimed in claim 1, wherein a closing cover (7) for closing off the second reception region (5) and for covering the housing (1) is arranged in the second reception region (5).

21. The rotary slide as claimed in claim 1, wherein a closing piece (26) for closing off the drive region (3) and the housing (1) is arranged in the drive region (3).

22. The rotary slide as claimed in claim 1, wherein a drive motor is associated with the spindle (16).

23. The rotary slide as claimed in claim 1, wherein a venting device (24) for venting the medium pressure is arranged on the housing (1).

* * * * *